United States Patent
Balasubramanian et al.

(10) Patent No.: US 11,838,984 B2
(45) Date of Patent: Dec. 5, 2023

(54) HIERARCHICAL DATABASE ARCHITECTURE FOR SUBSCRIBER CREDENTIAL MANAGEMENT IN ENTERPRISE NETWORKS

(71) Applicant: Celona, Inc., Cupertino, CA (US)

(72) Inventors: Srinivasan Balasubramanian, San Diego, CA (US); Rajeev Shah, Los Gatos, CA (US); Mehmet Yavuz, Palo Alto, CA (US); Suparna Kumar, Mountain View, CA (US)

(73) Assignee: Celona, Inc., Campbell, CA (US)

( * ) Notice: Subject to any disclaimer, the term of this patent is extended or adjusted under 35 U.S.C. 154(b) by 0 days.

(21) Appl. No.: 17/392,007

(22) Filed: Aug. 2, 2021

(65) Prior Publication Data

US 2022/0141643 A1   May 5, 2022

Related U.S. Application Data

(60) Provisional application No. 63/108,202, filed on Oct. 30, 2020.

(51) Int. Cl.
*H04W 8/18* (2009.01)
*H04W 12/06* (2021.01)
*H04W 4/60* (2018.01)

(52) U.S. Cl.
CPC .............. *H04W 8/18* (2013.01); *H04W 4/60* (2018.02); *H04W 12/06* (2013.01)

(58) Field of Classification Search
CPC ......... H04W 8/18; H04W 8/20; H04W 88/18; H04W 12/0431
See application file for complete search history.

(56) References Cited

U.S. PATENT DOCUMENTS

| | | |
|---|---|---|
| 2007/0202749 A1 | 8/2007 | Bhat et al. |
| 2012/0108294 A1 | 5/2012 | Kaul |
| 2016/0285881 A1* | 9/2016 | Huber ................. G06Q 20/405 |
| 2017/0093749 A1* | 3/2017 | Hoffmann ............... H04L 41/20 |
| 2020/0084614 A1* | 3/2020 | Xu ........................ H04W 8/082 |

OTHER PUBLICATIONS

Rodriguez, Kari, International Search Report and Written Opinion received from the USRO dated Jan. 14, 2022 for appln. No. PCT/US2021/055023, 11 pgs.

* cited by examiner

*Primary Examiner* — Dung Hong
(74) *Attorney, Agent, or Firm* — JAQUEZ LAND GREENHAUS & McFARLAND LLP; Bruce W. Greenhaus, Esq.

(57) ABSTRACT

A credential management system for enterprise networks (ENs) that allows credential storage in different levels and enables individual enterprises to manage the sets of credentials for the SIM cards used in their respective networks. Central management of credentials is provided by a remote cloud-based, centralized orchestration network (O-Net) that receives SIM cards from a SIM Provisioning Platform (SPP) and distributes the credentials to the ENs, which store the credentials in an enterprise global database and assign the SIM cards to the UEs. The credentials can be associated with specific policies and user groups so that the enterprise can control the type and quality of access allowed to UEs. Each EN may have a plurality of campus locations and at each location, a local credential database may be provided to act as a cache for quick efficient access to credentials by the UEs.

7 Claims, 10 Drawing Sheets

M2M Architecture
eUICC Remote Provisioning System (FIG. 1: SGP.02 Section 2.1) for IoT

HIERARCHICAL DATABASE ARCHITECTURE FOR SUBSCRIBER CREDENTIAL MANAGEMENT IN ENTERPRISE NETWORKS The present application claims priority to U.S. Provisional Application No. 63/108,202, filed Oct. 30, 2021, entitled "Multi-Tenancy Tiered CUPS Architecture for Subscriber Management", which is herein incorporated by reference in its entirety.

BACKGROUND

Technical Field

The disclosed method and apparatus relate generally to wireless access to enterprise wireless communication systems, and particularly to computer systems for providing and managing credentials and subscription information that allows access by user equipment devices into enterprise wireless networks.

Background

The wireless industry has experienced tremendous growth in recent years, with rapidly improving technology, faster and more numerous broadband communication networks are being installed around the globe. Wireless networks have now become key components of a worldwide communication system that connects people and businesses at speeds and on a scale unimaginable just a couple of decades ago, and these. In wireless systems, multiple mobile devices are served voice services, data services, and many other services over wireless connections so they may remain mobile while still connected.

Wireless networks are generally operated by large telecom companies, termed Mobile Network Operators (MNOs). Subscription systems are widely utilized by MNOs to control access to their wireless networks. Managing subscriptions is usually done in accordance with the current 3GPP (Third Generation Partnership Project) and GSMA (the GSM Association, also referred to as the Global System for Mobile Communications) standards forums. These subscription management standards are designed to cater to large Mobile Network Operators (MNOs), which typically have nationwide coverage and which each host a large number of users. In such large systems, it is appropriate to have a large single repository for storing the subscriber information. However, MNO subscription model is not viable for enterprise networks, as will be described.

FIG. 1 is an illustration of the architecture of a 4G network and FIG. 2 is an illustration of the architecture of a 5G network, either of which an MNO might use. A Subscriber Identification Module (SIM) card within a UE 101 is provisioned with the relevant credentials for accessing the MNO. In a 4G network (see FIG. 1) corresponding credential information is populated in an HSS 104 of an EPC 106, and for a 5G Network (see FIG. 2) the credential information is populated in a UDM 202 of a 5GC 204. The HSS/UDM may be implemented in the home operator's network in a central database. Load balancing and high-availability aspects are addressed through replicating the central database across the home operator's network entities. The replicated databases are kept in sync through periodic "commits" across the home operator's network entities.

Following is a list of some 4G acronyms shown in FIG. 1:

SGW: Serving Gateway
SGSN: Serving GPRS Support Node
MME: Mobility Management Entity
HSS: Home Subscriber Server
PCRF: Policy and Charging Rules Function.
Following is a list of 5G acronyms shown in FIG. 2:
NSSF: Network Slice Selection Function
AUSF: Authentication Server Function
UDM: Unified Data Management
AMF: Access and Mobility Management Function
SMF: Session Management Function
PCF: Policy Control Function
AF: Application Function
UPF: User Plane Function
DN: (Software) Defined Networking.

Before a UE can access the MNO network, its SIM card must be provisioned with the appropriate credentials. The SIM card may be a physical SIM card provisioned by the SPP, or an eSIM "card" in the UE that is provisioned remotely. Credentials include information stored on the card that is utilized in some way to gain access to a network, such as an Enterprise Network or an MNO Network.

UE SIM provisioning architectures for consumer and Internet of Things (IoT) models are defined by GSMA standards illustrated in FIG. 3 through FIG. 5. Particularly, FIG. 3 and FIG. 4 are diagrams of the SIM architecture for remote SIM Provisioning and Management of a UICC for consumer UEs, in which the LPA is in the eUICC of the UE (GSMA, Official Document SGP.22-SGP.22 RSP Technical Specification V2.2.2, Section 2.1).

FIG. 5 is a diagram of the SIM architecture for remote provisioning and management of the eUICCs, which is useful for IoT and M2M applications. (GSMA Official Document SGP.02, Section 2.1, Remote Provisioning Architecture for Embedded UICC Technical Specification, Version 3.2, Jun. 27, 2017).

FIG. 6 is a conceptual diagram of several different models for distributing credentials from a remote SIM Provisioning Platform (SPP) to a UE. In each of these models, the user (UE) interfaces with the SPP to obtain credentials that allow it to access a network via a Web Portal. The UEs typically receive credentials through either a pull model, examples of which are shown at 611 and 612, or a push model, one example of which is shown at 613.

The typical approach for pull models (611 and 612) is to use a quick response (QR) code-based method. In the first pull model 611, the QR code 602 can either be a unique QR code pointing to a SIM provisioning server 603 within a remote SIM provisioning platform 604. When a unique QR code 602 is used, it points to a specific credential. Accordingly, when a user 100 scans the QR code 602 with a UE 101a, the UE 101a is pointed to the SIM provisioning server 603 to receive the assigned credential, and this credential can be assigned to a user. Then the UE 101a has the credentials that allow it to communicate to a remote network/server 620 via a Web Portal 622.

In the second pull model 612, for a generic QR, such as can be used at conferences and in stadiums, the UE 101b scans a generic QR code 608 and the UE 101b communicates with the SIM provisioning server 603. In this part of the communication, the SIM provisioning server 603 assigns a unique credential to the UE 101 and sends it to the user (e.g., the UE 101b) for acceptance. Then the UE 101a has the credentials that allow it to communicate to a remote network/server 620 via a Web Portal 622.

The push model (613) can be done using Mobile Device Management (MDM) processes, or using the GSMA IoT (Internet of Things) model. The MDM processes are customized for each device vendor (e.g., Apple, Samsung, etc.) and require explicit modules to be supported on the UE 101 and the devices on the network side, which are typically hosted on enterprise IT servers. For IoT models, which are used for 'headless' devices, communication usually occurs through a device vendor specific Subscription Manager Secure Routing (SM-SR) platform which provides a secure connection through which the required credentials are pushed.

A wireless Enterprise network (EN) is one type of private network which is operated for use within a limited area by a limited group of authorized users. One or more ENs can be created at geographical locations such as warehouses, factories, research centers or other buildings, and are usually operated by an organization for its own use, or it may connect to one or more locations. Other types of private networks may be operated by a private network manager for use by more than one organization. An EN may utilize "4G LTE" (fourth generation Long-Term Evolution) or "5G NR". Through its network configuration, user equipment (UE) can connect to the services provided by the EN, and also to External Packet Data Networks (PDNs) that can provide a variety of services such as the Internet, Application Servers, Data Services, Voice Services, and others.

However, the MNO subscription model is not viable for controlling access to enterprise networks, given the following factors:

- The smaller number of users on an enterprise campus;
- The large variations in the population of different enterprises;
- Enterprises having multi-sites that may be geographically separated;
- Enterprise campus sizes vary based on sites even for the same enterprise;
- The amount of computing resources available on campus locations (typically set to allow large storage of information);
- Enterprise networks require customizations to manage access, services, and SLA/QoS for individual users and user groups on campus;
- Roaming within an enterprise (across site and roaming across enterprise campuses) requires specific policies to be addressed;
- A given user can be associated with one or more enterprise campuses;
- A given user can transition from one enterprise to another;
- It is desirable to reclaim credentials for potential reuse by other users both within an enterprise and across enterprises;
- It is desirable to allow for specific credential use for short periods of time (e.g., to support conferences/sport events) and potentially allow for the same credentials to be reused for different users from one conference to another in the same conference center/stadium, etc.;
- User Equipment (UE and EUD for users) are limited with regard to the number of embedded SIM credentials that can be stored; and
- A mechanism is required to release unused credentials from EUDs to allow a user to install other credentials.

All of these factors present unique problems for: (1) managing the credentials, (2) managing their associated enterprise policies, (3) scaling relative to the enterprise campus sizes, (4) managing secure storage, (5) associating the credentials and policies with one or more campuses, and (6) managing the potential for access to multiple core networks, which may be needed simultaneously.

Accordingly, it would be advantageous to provide a system that can manage subscriptions for users in an enterprise network and overcome some of the challenges noted above.

SUMMARY

The presently disclosed communication system architecture allows information storage in different levels and enables individual enterprises to manage the sets of credentials that are used in their respective networks. The credentials can be associated with specific policies so that the enterprise can control the type and quality of access allowed to UEs. Central management of credentials, across many independent enterprise networks (ENs), advantageously allows a plurality of ENs to be supported by a single entity. In one embodiment the single entity is a remote cloud-based, centralized orchestration network (O-NET), and each EN can be managed as a customer of the O-NET.

Working with a SIM Provisioning Platform (SPP) the O-Net requests provisioning for a batch of SIM cards, including either or both physical SIMs and embedded SIMs. All the credential information is generated as "response data" to the request. The credential information is provided for both the physical and embedded SIMs received from the SIM provisioning server, and is loaded as a plurality of credential entries into a central cloud storage (the O-GCD) in the O-NET. Distribution of the credential information from the O-GCD to the ENs can be managed across the enterprise campuses by the O-NET. Each credential entry is associated with an explicit tag and has a unique ICCID (Integrated Circuit Card Identifier) & IMSI (International Mobile Subscriber Identity) provisioned. The physical SIMs are distributed to the enterprise networks and campuses using generic profiles. The credentials are stored in each EN's global credential database (E-GCD). Parameters such as policies and user groups may be customized by the EN as needed or useful. The embedded SIMs can be installed into the UEs in a controlled manner by the enterprise's information technology (IT) personnel, including assigning specific tags to individual users. This can be done for example by distributing a QR code or using Mobile Device Management (MDM) methods.

Each EN may have a plurality of campus locations and at each location, a local credential database (E-LCD) may be provided, connected to the E-GCD, to act as a cache for quick efficient access to credentials by the UEs.

In some embodiments the enterprise wireless network operates on the Citizen's Broadband Radio Service (CBRS band), the BS/APs in the RAN comprise CBRS Devices (CBSDs) that are located at a campus location and form part of an enterprise network. In alternative implementations, other network architectures and other technologies, such as mm-wave, or spectrum purchased/licensed from others, could be utilized.

BRIEF DESCRIPTION OF THE DRAWING

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

DETAILED DESCRIPTION (1) Enterprise Network

An implementation of an enterprise wireless communication network (EN) at a campus location is described herein. The term "enterprise" is used herein in its broadest sense to include any organization, such as businesses, research organizations, schools, colleges, hospitals, industry organizations, and any other organization, regardless of whether or not for profit. The term "campus" is used in its broadest sense to include any area in which the enterprise operates, such as the grounds and/or buildings operated or managed by the enterprise, college campuses, research centers, industrial complexes, any business or industrial site, and others.

An enterprise wireless communication network (EN) is a private network. Private networks are operated for use within a limited area by a limited group of authorized users, whereas public networks generally cover a larger area and are open for use by anyone that subscribes to the service by the network operator. One or more ENs can be created at a location such as a warehouse, factory, research center or other building, and are usually operated by an organization for its own use. Other types of private networks may be operated by a private network manager for use by more than one organization. Although described in the context of an enterprise wireless communication network, the principles disclosed can also apply to any private wireless network.

Figure 1:
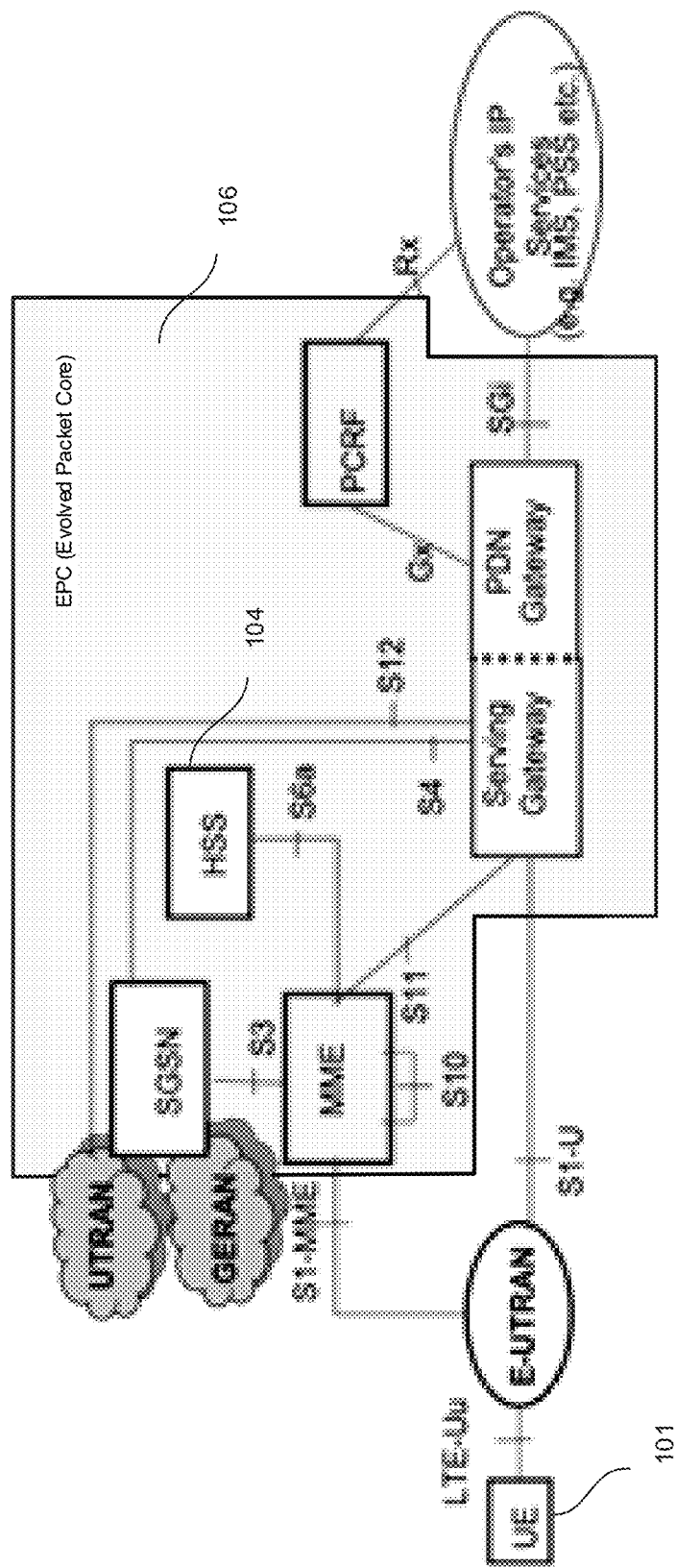
FIG. 1 is a block diagram of an architecture of a 4G wireless network.
Figure 2:
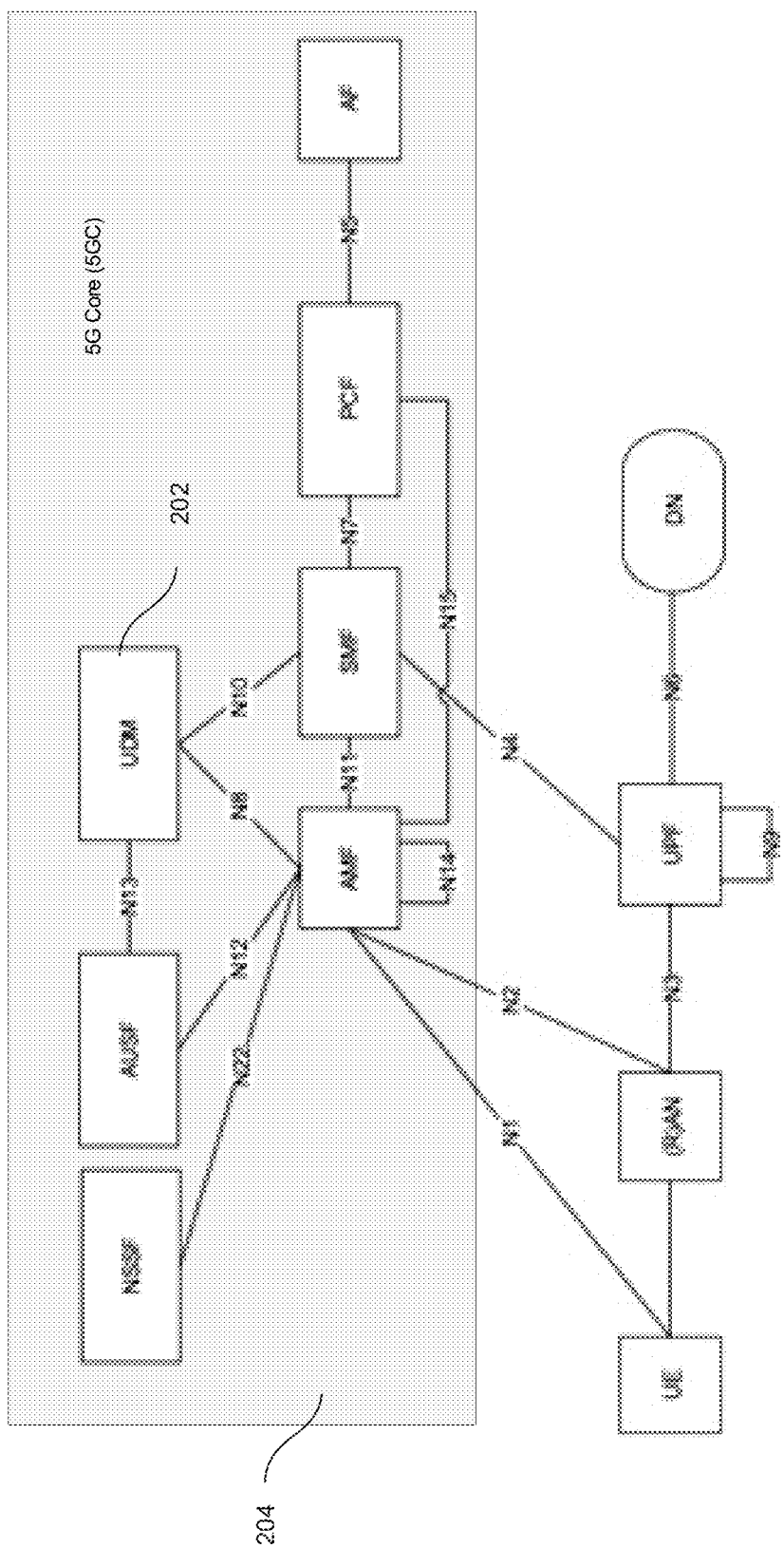
FIG. 2 is a block diagram of an architecture of a 5G wireless network.

An EN may comprise any appropriate wireless network technology that can connect to UEs. For example, the LTE (4G) network shown in FIG. 1 and/or the NR (5G) Network shown in FIG. 2 can be implemented in an EN. In addition, the EN may also be implemented as a CBRS network using, for example, the LTE(4G) or NR(5G) technologies.

(2) Communication Networks

Communication networks and system components may be described herein using terminology and components relating to 4G, 5G, and CBRS systems and their approved (registered) interfaces including 4G (LTE) (IEEE 802.16e), 5G NR 3GPP TS 38.300, E_UTRA (3GPP TS 36.300) communication systems. For instance, the term "CBSD" is one implementation of a Base Station/Access Point (BS/AP), and used herein for descriptive purposes in the context of a CBRS system. The principles of the communication network described herein more widely apply to other communication networks and systems, and particularly to any spectrum-controlled communication system and network. In some embodiments, the enterprise wireless communication network operates on the CBRS band, and the BS/APs comprise CBRS devices (CBSDs) that are located at a campus location.

(3) Acronyms

Some of the acronyms used herein are as follows:

Credentials: Data that is used to determine whether or not a UE has access to a network.

ECASD (in the eUICC): The Embedded UICC Controlling Authority Security Domain is responsible for secure storage of credentials required to support the required Security Domains on the eUICC.

EID Pairing: Electronic ID Pairing eUICC: embedded UICC. A removable or non-removable UICC which enables the remote and/or local management of Profiles in a secure way.

eSIMs: embedded SIM cards

EUD: End User Device

FQDN: Fully Qualified Domain Name

ICCID: Integrated Circuit Card Identifier

IMSI: International Mobile Subscriber Identity

LPA: Local Profile Assistant: A functional element in the Device or in the eUICC that provides the Local Profile Download (LPD), Local Discovery Services (LDS) and Local User Interface (LUI) features. When the LPA is located in the Device, they are called LPAd, LPDd, LUId, LDSd. When the LPA is located in the eUICC, they are called LPAe, LPDe, LUIe, LDSe. Where LPA, LPD, LDS or LUI are used, they apply to the element independent of its location in the Device or in the eUICC.

LPDd: Local Profile Assistant: generally present in each UE device d

Figure 5:
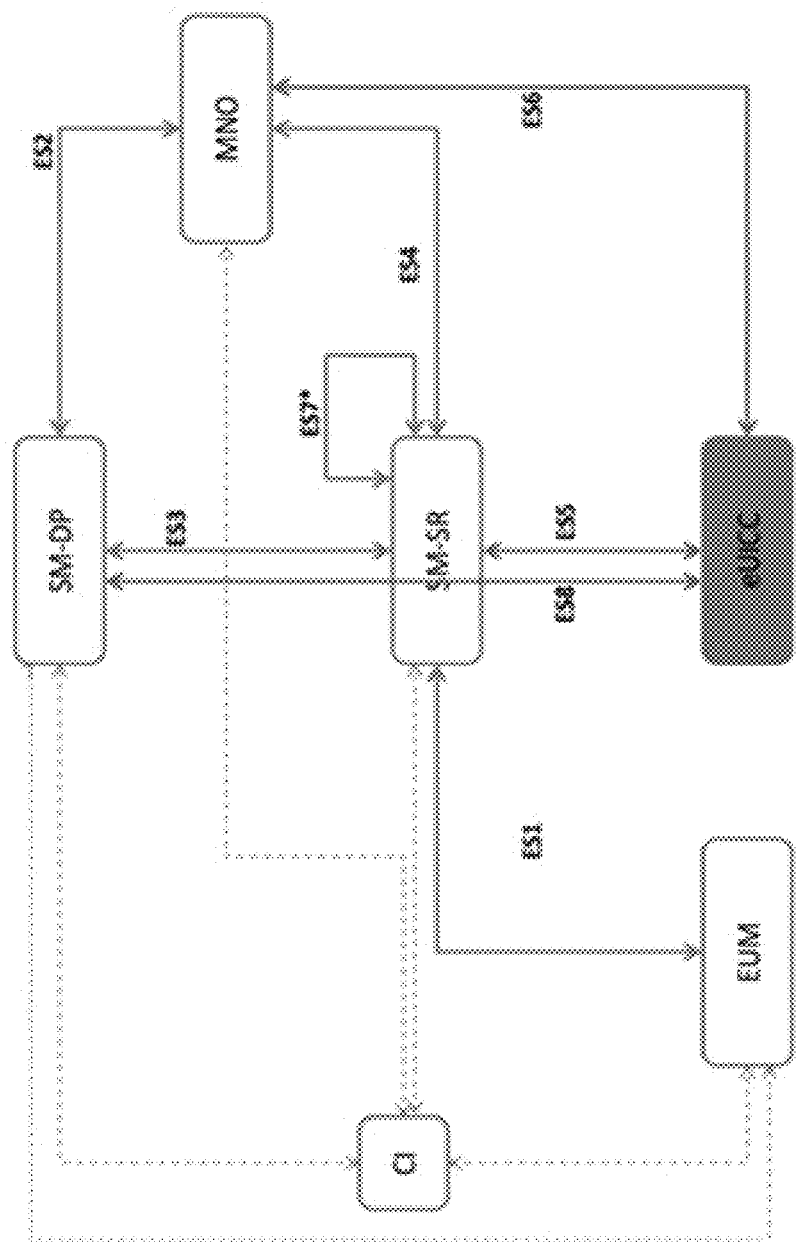
FIG. 5 is a diagram of the SIM architecture for remote provisioning and management of eUICCs, which is useful for IoT and M2M applications.
Figure 6:
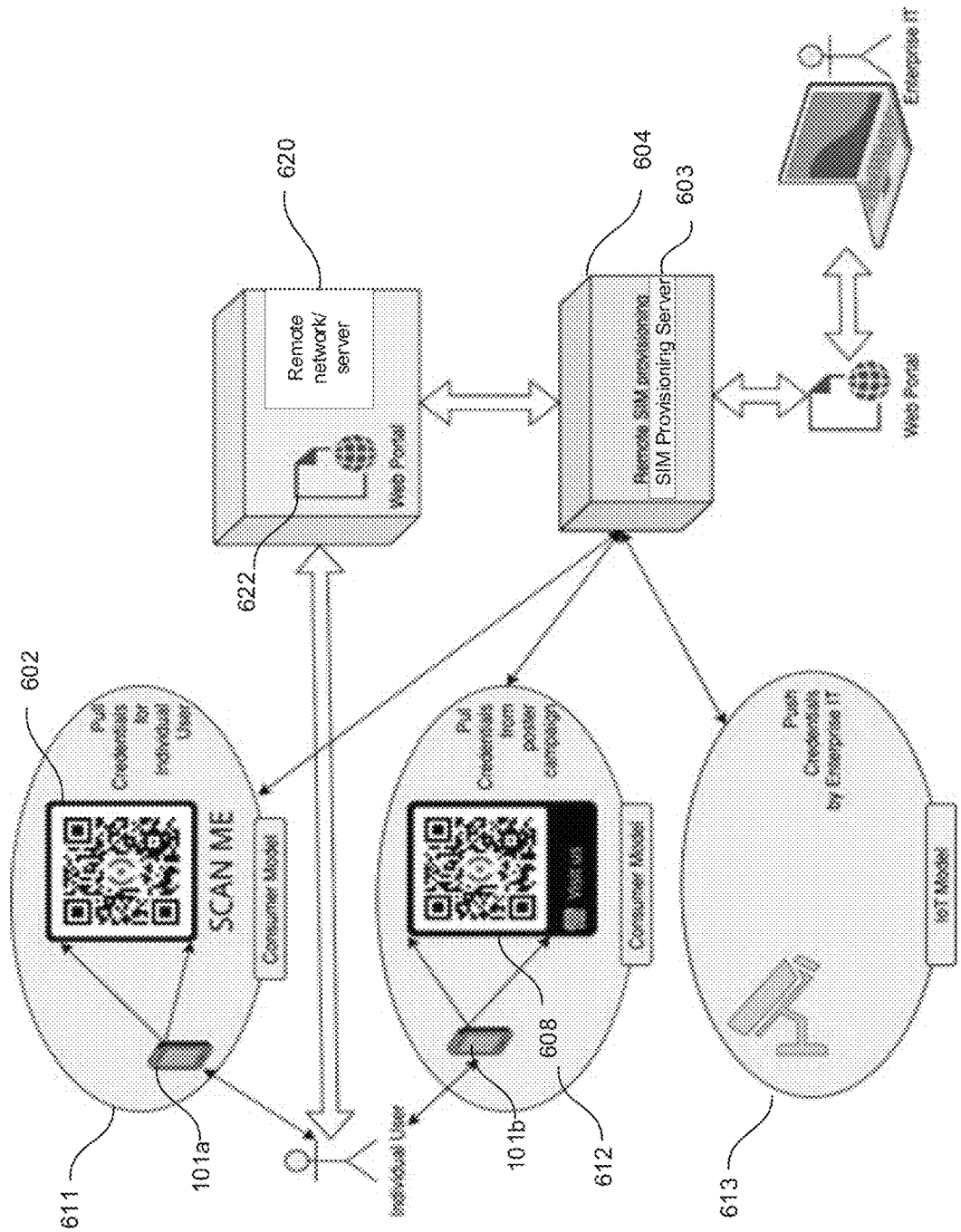
FIG. 6 is a conceptual diagram of several different models for distributing credentials from a remote SIM Provisioning Platform (SPP) to a UE.

M2M eSIM architecture (FIG. 5)

Profile: A combination of data and applications to be provisioned on an eUICC for the purpose of providing services.

SIM card: Subscriber Identification Module card

SM-DP: Subscription Manager Data Preparation

Figure 4:
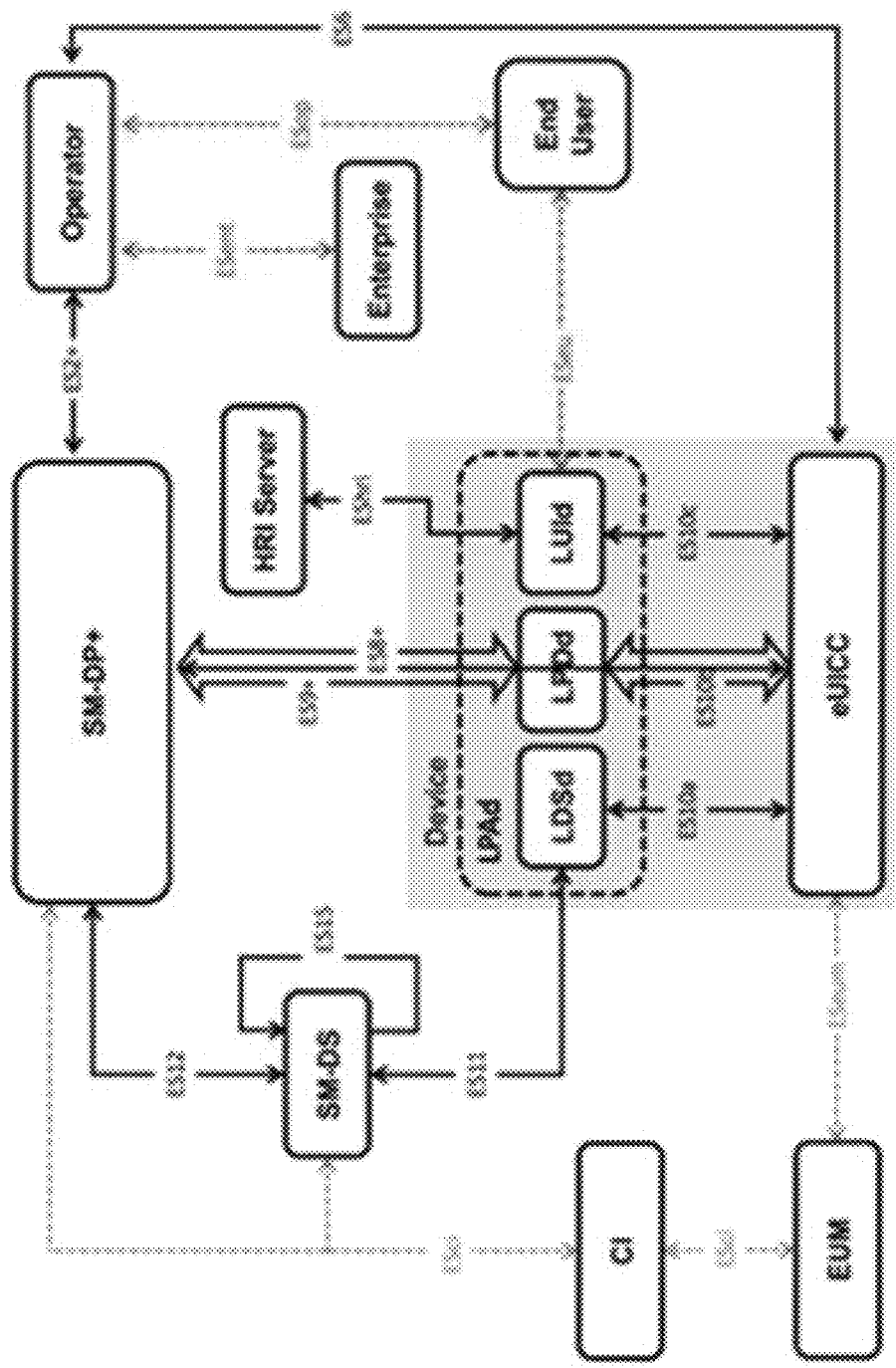
FIG. 4 is a block diagram of a second SIM architecture for remote SIM Provisioning and Management of a UICC for consumer UEs.

SM-DP+(Subscriber Management–Data Preparation+) combines SM-DP and SM-SR. Used to encrypt operator credentials during an over-the-air SIM activation See GSMA Consumer Standard (SGP.22) SM-DP+ is shown in FIG. 4. This role prepares Profile Packages, secures them with a Profile Protection Key, stores Profile Protection Keys in a secure manner and the Protected Profile Packages in a Profile Package repository, and allocates the Protected Profile Packages to specified EIDs. The SM-DP+binds Protected Profile Packages to the respective EID and securely downloads these Bound Profile Packages to the LPA of the respective eUICC.

SM-SR: Subscription Manager Secure Routing

SM-DS: provides addresses of one or more SM-DP+'s to an LDS

UICC: Universal Integrated Circuit Card

UDM: Unified data management (UDM) manages network user data in a single, centralized element. The technology is similar to the 4G network's home subscriber service (HSS) but is cloud-native and designed for 5G specifically. It can be paired with the user data repository (UDR) which stores the user data such as customer profile information, customer authentication information, and encryption keys for the information. UDM resides on the control plane and utilizes microservices to communicate between the user plane and the control plane.

(4) UEs, BS/APs, Core Network

As used herein, the term "UE", or "devices", or "UE devices" refers to a wide range of user_devices having wireless connectivity, such as a cellular mobile phone, an Internet of Things (JOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed or placed at a fixed position within a campus location. UEs also include SIM cards, which may be physical SIM cards or eSIM cards. A SIM card in the UE maintains subscription information for all the networks that the UE can connect to. UEs typically have service subscriptions with one or more wireless networks; for example, each UE has subscription information that gives it access to one or more of the MNOs, the ENs, and other networks, private or otherwise, to which the UE is subscribed. If the UE detects a signal from a network, and if the UE is a subscriber to that particular network, the UE may request admission (i.e., entry) to the network using the credentials in the subscription information, and if authenticated, then the UE can be admitted. Once admitted, the UE will be assigned services, which may be based upon policies and user groups. Examples of services that can be provided by a wireless network include:

voice calls;
web browsing;
downloads of document or other information;
video (e.g., YouTube);
social media (e.g., Facebook, Twitter); and
video security cameras, sensors, and many others.

The UEs connect wirelessly over radio communication links to a Radio Access Network (RAN) that typically includes multiple base station/access points (BS/APs) that include antennas, amplifiers and other electrical and control units for communicating with the UEs. Typically, the radio communication links operate using a Radio Resource Control (RRC) protocol, which is managed by circuitry in the BS/APs. One of the advantages of such wireless networks is their ability to provide communications to and from multiple wireless devices and provide these wireless devices with access to a large number of other devices and services even though the devices may be mobile and moving from location to location.

The term 'BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs and circuitry that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

The RAN connects the UEs with a Core Network, which provides an interface between the RAN and other networks. The Core Network can have multiple functions. In one important function, the Core Network provides access to other devices and services either within its network, or on other networks such as the External PDNs. Particularly, in cellular networks and in private networks, the BS/AP can receive wireless signals from, and send wireless signals to, the UEs. The RAN is coupled to the Core Network; therefore, the RAN and the Core Network provide a system that allows information to flow between a UE in the cellular or private network and other networks, such as the Public Switched Telephone Network (PSTN) or the Internet. Wireless data transmission between a UE and a BS/AP occurs on an assigned channel, such as a specific frequency. Data transmission between the BS/AP and the Core Network utilizes any appropriate communication means, such as wireless, cable, and fiber optic.

In addition to providing access to remote networks and allowing information to flow between the cellular network and the external PDNs, the Core Network may include RAN Control Units that manage the wireless network and provide control of the air interface between the BS/AP and the UEs. The Core Network may also coordinate the BS/APs 109 to minimize interference within the network.

(5) CBRS Networks

One type of wireless network that recently became available for general use by enterprise locations is a Citizen's Broadband Radio Service (CBRS) network, which utilizes the CBRS radio band of 3550-3700 MHz, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices. CBRS provides enormous wireless networking power to organizations that have never had such option before and opens up and creates opportunities for a range of new applications. Base stations (BS/APs) within a CBRS network are termed "CBSDs", and UEs are termed End User Devices (EUDs). All the CBSDs are connected to an operator Core Network by any appropriate communication means, such as wire, fiber optic, wireless radio and/or a PDN, which includes components such as an OAM Server, a SON assist unit, a Domain Proxy, an Automatic Configuration Server (ACS), a Location Database, and other databases, all of which are connected to each other within the operator Core Network by any appropriate means. The operator Core Network is connected to an SAS, which is connected to a Spectrum Database that includes data regarding the spectrum that it is managing. Collectively, the SAS and the Spectrum Database are referred to as a Spectrum Management Entity (SME).

(6) Overview/Summary

Figure 8:
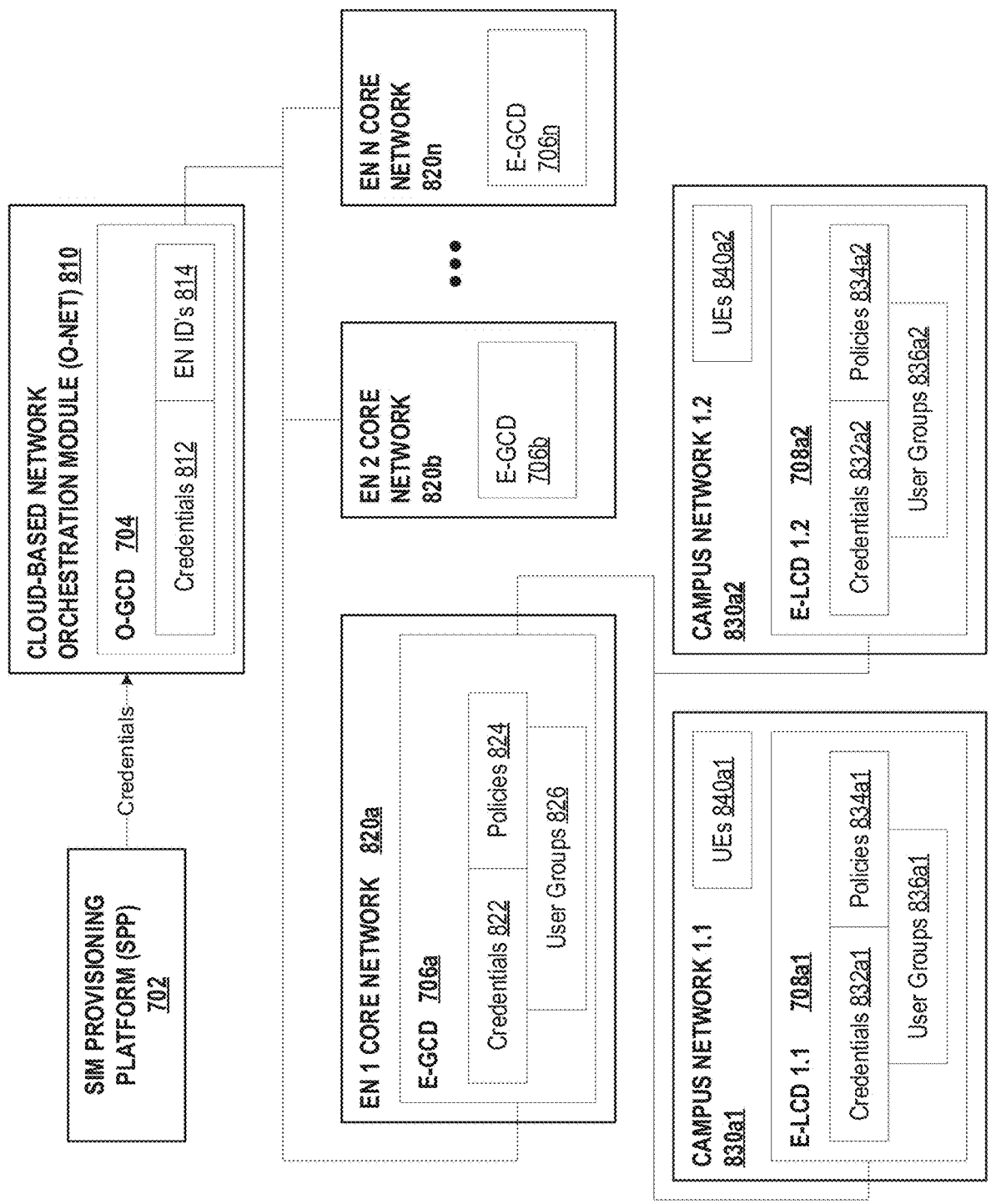
FIG. 8 is a block diagram of a one embodiment of a network configuration showing database data connections for one EN that implements the multi-level hierarchical subscription database.

A hierarchical communication system architecture is described herein that allows information storage in different levels and enables individual enterprises to manage the sets of credentials that are used in their respective networks. The credentials can be associated with specific policies so that the enterprise can control the type and quality of access allowed to UEs. Central management of credentials, across many independent enterprise networks, advantageously allows a plurality of enterprise networks to be supported by a single entity. In one embodiment the single entity is a remote cloud-based, centralized orchestration network (O-NET) 810 (FIG. 8). As will be described, each enterprise can be managed as a customer of the O-NET 810.

(7) Database Hierarchy

Figure 7:
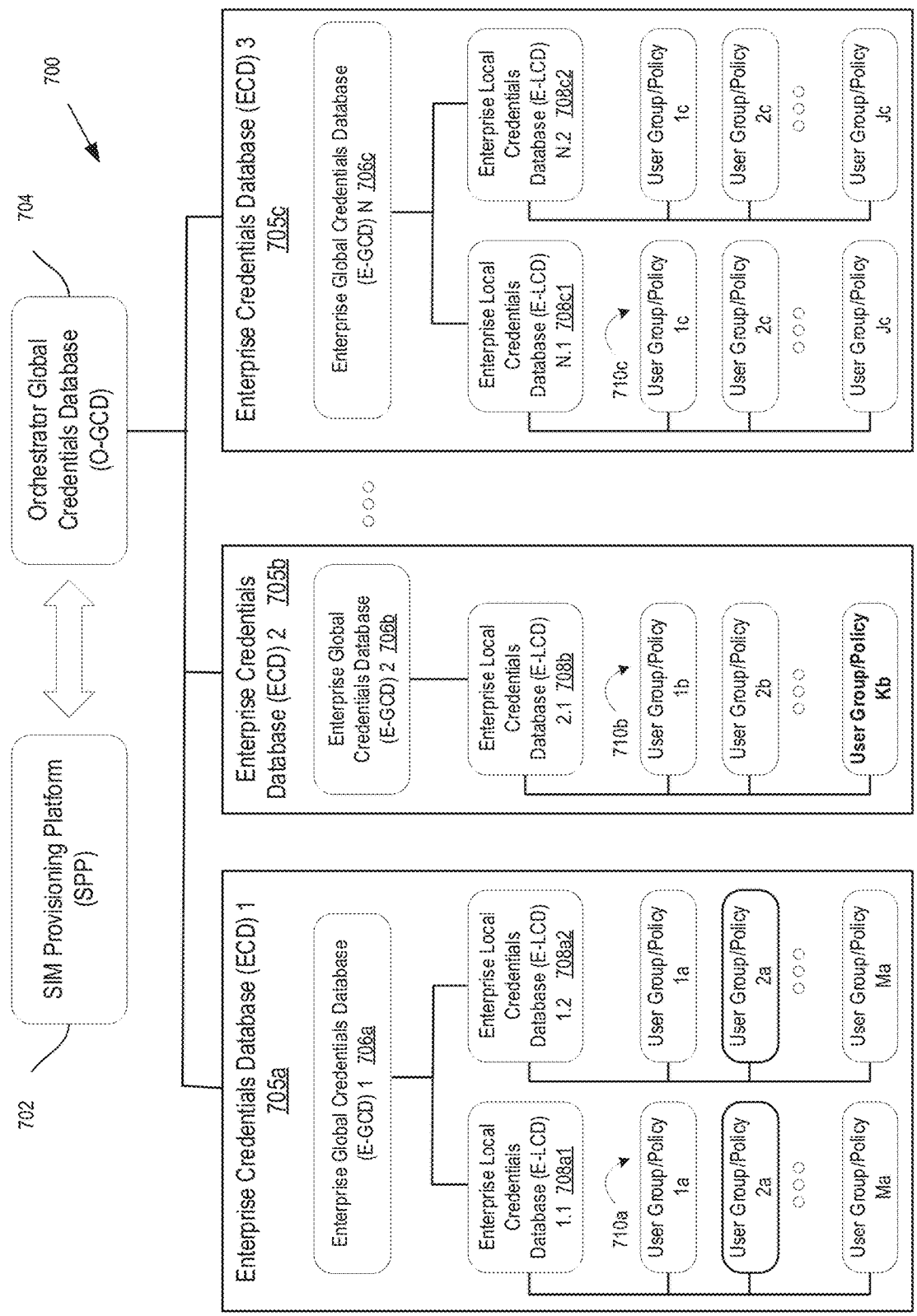
FIG. 7 is an illustration of a hierarchically structured subscription data management system 700 for managing a database in accordance with some embodiments of the presently disclosed method and system.

FIG. 7 is a block diagram of a multi-level, hierarchically-structured subscription database system 700 in accordance with some embodiments of the presently disclosed method and system. FIG. 8 is a block diagram of a one embodiment of a network configuration showing database data connections for one EN that implements the multi-level hierarchical subscription database. Reference in the following description is made to both; numbers that begin with "7" are shown in FIGS. 7 and 8, and reference numbers that begin with "8" are shown in FIG. 8.

(8) Level 1: SIM Provisioning Platform (SPP)

A SIM provisioning platform (SPP) 702 resides in the highest level (i.e., Level 1) of the hierarchy 700 outside the O-GCD. The SPP 702 can be any provisioning platform that provides SIM cards for installation in UE. The SIM cards provided by the SPP can be actual physical SIM cards or electronic eSIM cards, provisioned according to standards. Within the SPP 702, all the credentials for both the physical and embedded SIMs may be retained in a server (not shown).

(9) Level 2: Orchestrator Global Credentials Database (O-GCD)

An Orchestrator Global Credentials Database (O-GCD) 704 resides within the Network Orchestration Module (O-Net) 810 and provides the second level (i.e., Level 2) of the hierarchy 700. The O-GCD 704 is a global database of all the credentials managed for the different O-GCD customers. In operation the O-Net 810 requests SIM cards (either or both physical SIMs and embedded SIMs) from the SPP 702, and when the 'response data' is received the corresponding credentials 812 are loaded into the O-GCD 704.

The O-Net 810 is connected to a plurality of EN Core Networks 820, each of which includes an E-GCD 706. From the O-GCD 704 in the O-Net 810, when SIM card purchases are made by the individual enterprise campuses for physical and embedded SIMs, the EN's IDs 814 will be associated with the respective credentials and the selected credentials will be released to specific Enterprise Credentials Databases (ECDs) 705 that reside in the EN's Core Network 820.

It should be noted that reference designations used in the figures may have both numeric and alphabetic characters. Those reference designations having the same numeric characters refer to similar features in the figure. For example, the first E-GCD database 706a has a structure similar to the second E-GCD database 706b. Furthermore, features having the same numeric characters can be referenced collectively by the numeric portion of the reference designation alone. For example, all of the databases may be referenced together as "databases 706".

(10) Level 3: Enterprise Global Credentials Database (E-GCD)

The ECDs 705 that receive the credentials from the O-GCD 704 each comprise an Enterprise Global Credentials Database (E-GCD) 706 that resides in a third level of the hierarchy 700 (i.e., Level 3). Each E-GCD 706 is an enterprise-wide global database that stores and supports some or all of the credentials associated with a given enterprise (i.e., for multiple enterprise user groups, across multiple enterprise locations). The E-GCD 706 is maintained in a multi-tenancy platform that includes the O-Net 810 and the EN Core Networks 820. In the multi-tenancy platform, the O-GCD 704 advantageously supports all the individual enterprises in a central cloud managed by the O-GCD.

In operation, when an enterprise generates a request to the O-GCD 704 for credentials, the O-GCD assigns the associated credentials, along with appropriate tags, to the enterprise. The credentials are then populated from the O-GCD 704 into the E-GCD 706.

In the E-GCDs 706, each stored credential 822 may be associated with one or more user groups 826 and/or specific policies 824 applied to UEs. These aspects may be managed, orchestrated and provisioned to the UEs by the enterprise IT personnel (or software) that regulate the enterprise's on-campus policies.

(11) Policies

In order to set Policies 824 and set up user groups 826 (which may be based upon policies), a User Interface (UI) may be provided, connected to the Core Network 820, which can be used by the managing entity (e.g., an IT administrator), to manually select and re-define the policies and user groups of the EN and each Campus Network. This UI allows the managing entity to change Policies 824 and User Groups 826 as needed or useful, which allows the enterprise to selectively throttle certain services and users, while giving other users priority.

To establish policies (i.e., preferences), some of the dimensions (parameters) to be considered may include:
ranges in the allowed QoS parameters,
voice bit rate,
other bit rates (e.g., security camera bit rate, web browsing),
restrict the numbers of users supporting a given service (set to minimum),
region(s) of the network,
day-of-the-week,
time-of-the-day, and
defining the relative priority of a particular service.

(12) Level 4: Enterprise Local Credentials Database (E-LCD)

In addition to the E-GCDs 706, each of the ECDs 705 also comprises at least one Enterprise Local Credentials Database (E-LCD) 708, which define a fourth level of the hierarchy 700 (i.e., Level 4). The E-LCDs 708 are preferably located in Campus Networks 830, connected to their respective Core Networks 820. The E-LCDs 708 are provided subscription information from the E-GCDs 706 for the UEs 840 in the Campus Networks, and the E-LCDs 708 store subscription information for the UEs 840 in their respective Campus Networks; particularly, the stored subscription information includes Credentials 832 (supported as part of the SIM credential provisioning), associated User Groups 836 and/or Specific Policies 834 applied to individuals, as shown generally at 710. For example, as shown in FIG. 8, selected Credentials 822a, and associated Policies 824a and User Groups 826*a* may be provided from the E-GCD 706*a* and stored in the E-LCD 708*a*1 as Credentials 832*a*1, Policies 834*a*1, and User Groups 836*a*1 for use by the UEs 840*a*1 in the Campus Network 830*a*1.

The E-LCDs 708 serve as a local cache for the UEs on the enterprise premises, providing quick access to the user's credentials and associated policy information. Quick access avoids the communication costs and overhead that would otherwise occur due to repeated access to the central cloud or a remote server, such to repeatedly request the same information. The cache entries, when not used for a period of time (e.g., 1 week), may be cleared from the E-LCDs 708. If a given entry is not available in the local cache, the E-GCD 706 may be accessed to retrieve the information and then it may be stored in the appropriate E-LCD cache 708 for quick access. The credentials in the E-LCDs 708 are a cached copy; the E-GCDs provide a main source of the data.

In some embodiments, the cached entry may be cleared from the E-LCD 708 by a command received from the E-GCD 706. This allows the databases that are on premises to be sized appropriately to avoid unnecessary information to be cached for long periods of time. The information in the E-LCD 708 is cleared together with the information in the E-GCD 706 prior to releasing credentials back to the O-GCD 704.

(13) Network Diagram including Campus Locations

Figure 9:
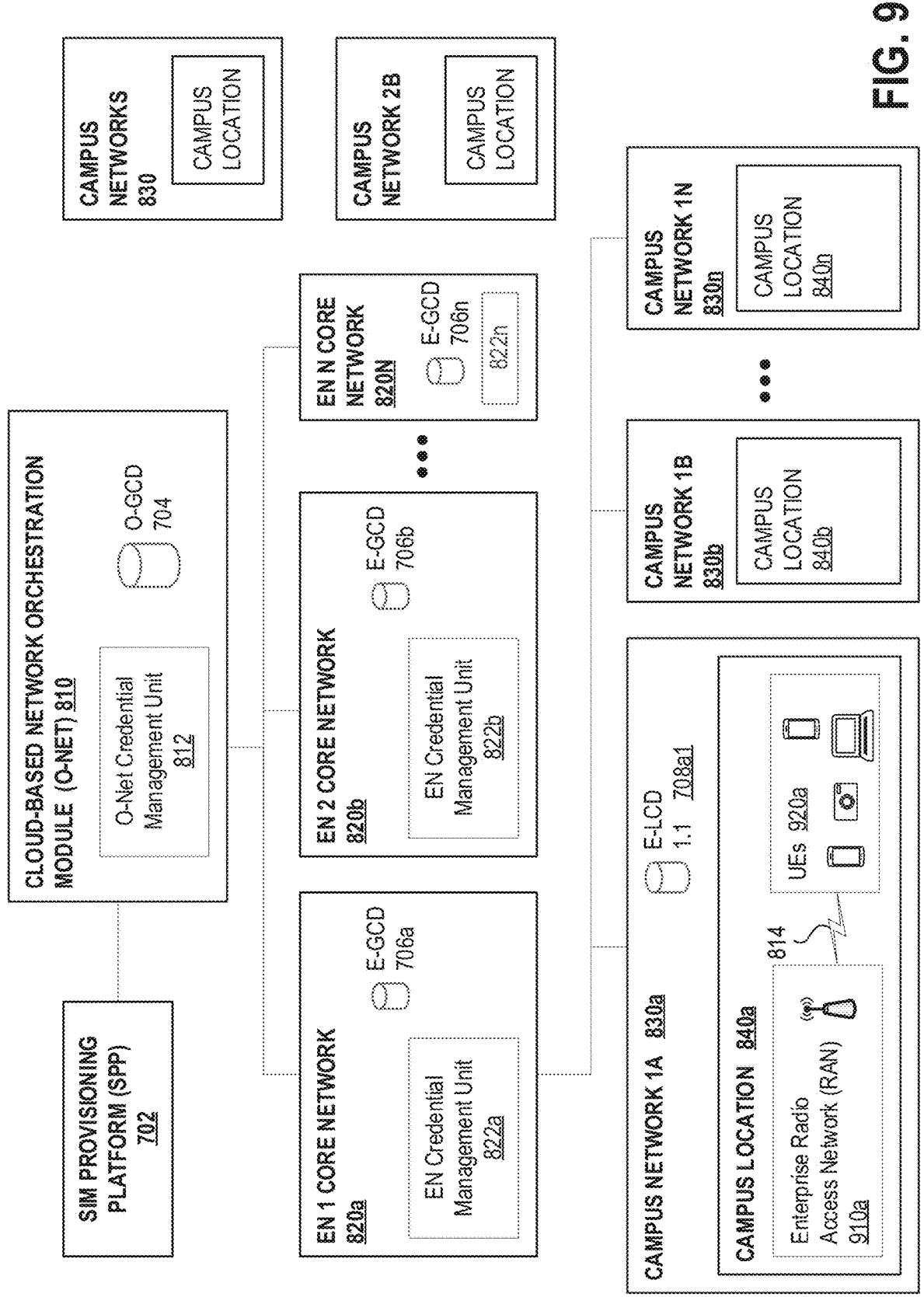
FIG. 9 is a block diagram of a Network Configuration including the O-Net connected to a plurality of Core Networks 820, which are connected to a plurality of Campus Networks 830 respectively located at or near a plurality of Campus Locations 840.

FIG. 9 is a block diagram of a Network Configuration including the O-Net 810 connected to a plurality of Core Networks 820, which are connected to a plurality of Campus Networks 830 respectively located at or near a plurality of Campus Locations 840. The SPP 702 is communicatively connected to the Cloud-Based Network Orchestration Module (O-Net) 810, which is communicatively connected to the plurality of EN Core Networks 820. The O-Net 810 includes an O-Net Credential Management Unit 812 that communicates with the SPP 702 and the Core Networks 820, and performs credential functions described herein. The O-Net 810 also includes other units (not shown) such as an Administrative Service Unit for remote administration of the enterprise network, databases, other components as may be necessary or useful, and other functional units such as machine learning and artificial intelligence units. The O-Net 810 is connected to the Core Networks 820 by any appropriate communications means, and generally, the O-Net 810 supports the Core Networks 820 and provide additional services.

The Core Networks 820 (which may also be called a Programmable service edge or "PSE") each include an EN Credential Management Unit 822 that communicates with the O-Net 810 and the Campus Networks 830, and performs credential functions described herein. The Core Networks 820 provide a variety of services for their respective EN using a plurality of components (not shown) connected to each other by any appropriate means, and may for example be 4G or 5G networks that implement a CBRS configuration. Some components (not shown in FIG. 9) may include a MMF (Mobility Management Function) unit, a SON (Self Organizing Network) service unit, a monitoring service unit, an SGW/PGW (Serving Gateway/Packet Data Network Gateway) unit, a domain proxy, a TR069 unit, and a KPI (Key Performance Indicator) service unit. The Core Networks 820 may also include databases such as a Location Database and other databases, and other units such as an Operations, Administration, and Maintenance (OAM) Server, an Automatic Configuration Server (ACS), and units for other services. User interfaces may be provided and connected to the Core Networks 820 for administration of the EN by IT personnel.

Each of the EN Core Networks 820 is connected to a plurality of EN Campus Networks 830, for example the EN Core Network 820*a* is connected respectively to first, second, and third Campus Networks 830*a*1, 830*a*2, 830*an*. The Campus Networks 830 include the respective E-LCDs 708 associated with their Core Networks, and may include some of the elements of the Core Network 820 to which they are attached.

Each Campus Network 830 is situated on or nearby one or more Campus Locations 840. In a typical enterprise network deployment, the BS/APs and elements of the RAN 910 will be located on the Campus Locations, and it is very likely that most elements of the Campus Network 830, like the E-LCDs 708, will be physically located at or near the enterprise location, especially in large or multiple deployments in the same area. Each Campus Location 840 includes one or more Radio Access Networks (RAN) 910 that comprise a plurality of BS/APs wirelessly connected to a plurality of UEs 920 on the Campus Locations 840, or within wireless range of the RAN. The RANs 910 provide a wireless connection and services to the plurality of UEs on the campus location. The RANs 910 are connected to the EN Core Networks 820 by any suitable connection in the Campus Network 830. For example, all the BS/APs in the RAN 910*a* may be connected to a Packet Data Network (PDN) in the Campus Network 1A 830*a* by any appropriate communications means, such as wire, fiber optic, and wireless radio, which is then connected via to its Core Network 820*a*, thereby allowing the UEs 920*a* to communicate with the Core Network 820*a*. The BS/APs in the RANs 910 are connected to, and operated and controlled by, the Core Network 820. Some of the RAN services may be provided by the Core Network 820.

Figure 10:
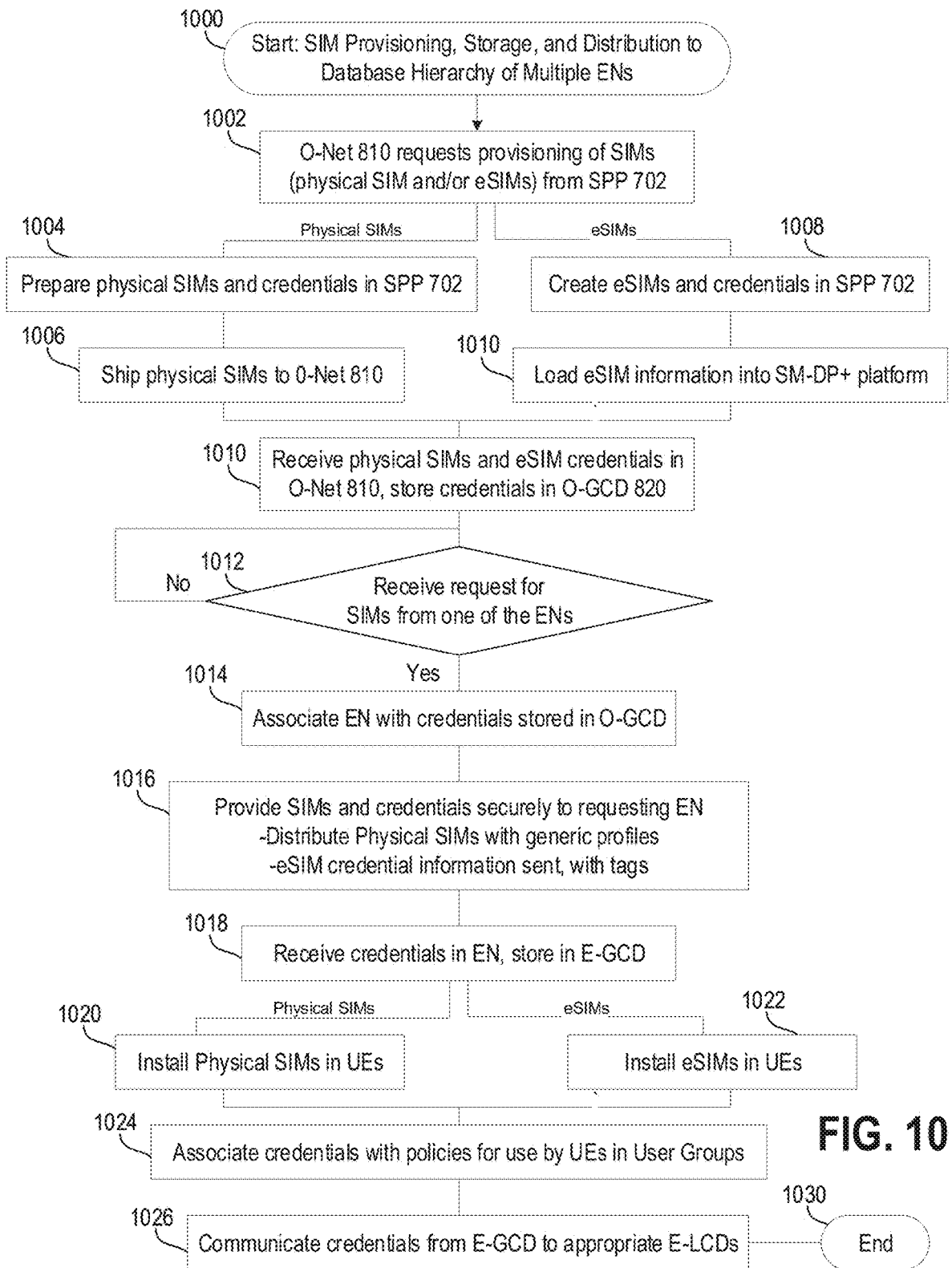
FIG. 10 is a flow chart of operations to obtain and distribute SIM cards to UEs using a central O-Net that obtains the credentials from the SPP and distributes the SIMs to multiple ENs using a hierarchical database structure The figures are not intended to be exhaustive or to limit the claimed invention to the precise form disclosed. It should be understood that the disclosed method and apparatus can be practiced with modification and alteration, and that the invention should be limited only by the claims and the equivalents thereof.

(14) FIG. 10 Flow Chart

FIG. 10 is a flow chart of operations to obtain and distribute SIM cards to UEs using a central O-Net that obtains the credentials from the SPP and distributes the SIMs to multiple ENs using a hierarchical database structure.

Operations for SIM Provisioning, Storage, and Distribution of SIM Cards to Multiple ENs using the Database Hierarchy begin as shown at 1000. In the first step (STEP 1002) the O-Net 810 requests provisioning for a batch of physical SIMs and/or a batch of embedded SIMs from the SPP 702. This request may be the result of a request from one of the ENs that O-Net 810 is serving, or may be generated pre-emptively if the O-Net 810 predicts that more SIM cards will be needed, for example if the number of available SIM cards in the O-GCD 704 drops below a threshold value.

In response to a request for physical SIM cards, the SPP 702 prepares (STEP 1004) physical SIMs in a manufacturing facility with an appropriate profile and then ships them (STEP 1006) to the operators of the O-Net 810 for intermediate staging prior to delivery to an EN.

Figure 3:
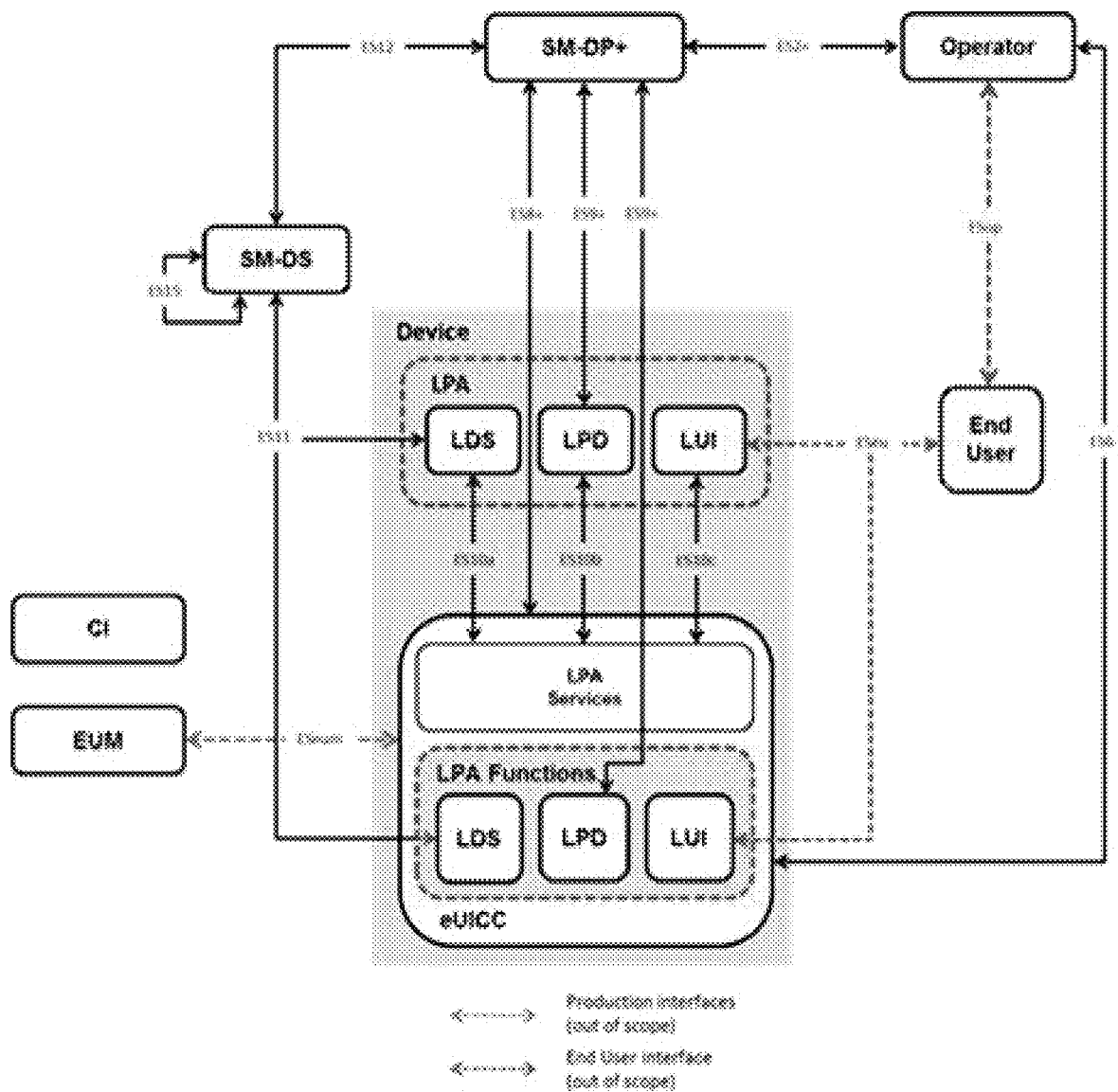
FIG. 3 is a block diagram of a first SIM architecture for remote SIM Provisioning and Management of a UICC for consumer UEs.

In response to a request for embedded SIM cards (eSIMs), the eSIM credentials are created (STEP 1008), and the information is loaded (STEP 1010) into an SM-DP+platform as is known to those skilled in the art (for example see FIGS. 3 and 4) and response data is generated.

All the credential information is generated as "response data" to the request, and is provided for both the physical and embedded SIMs received from the SIM provisioning server. The credentials are created in the 'available' state, which allows the credential to be assigned to any device/user.

When the response data for the physical SIMs and the embedded SIMs is received (STEP 1012) from the SPP 702, the data is loaded into the O-GCD 704. Particularly, the credential information is loaded as a plurality of credential entries into a central cloud storage (the O-GCD 704) in the O-NET 810.

(15) Distribution to ENs

When a specific EN or enterprise campus requires a batch of physical SIM cards, (STEP 1012), the request is placed with the O-Net 810, and the EN is associated with the credentials in the O-GCD. The relevant customizations for that enterprise campus are done prior to delivery. From the O-GCD 704, based on the purchases made by the individual enterprise campuses for physical and embedded SIMs, the credentials will be distributed (STEP 1016) to specific Enterprise Credentials Databases (ECDs) 705.

Distribution of the credential information from the O-GCD can be managed across the enterprise campuses by the O-NET. Each credential entry is associated with an explicit tag and has a unique ICCID (Integrated Circuit Card Identifier) & IMSI (International Mobile Subscriber Identity) provisioned.

The physical SIMs are distributed to the requesting enterprise campuses with generic profiles. Parameters may be customized as needed before or after distribution to the ENs.

The distribution of the credentials to the individual enterprises can be done either in batches or the enterprise campus can request that the SPP 702 generate an order for the E-GCD 706 to provide the number of physical and embedded SIM credentials for which the enterprise desires credentials. The O-GCD releases the requested amounts of credential information based on an ad hoc purchase basis or as individual users/devices sign onto the system. If a new credential needs to be pulled from the O-GCD 704 and assigned to an E-GCD 706 (and hence to one or more E-LCDs 708), the credentials can be pulled dynamically upon request. This process can also be established using the available credentials from an E-GCD 706, and when there are available credentials, a batch of credentials can be pulled from the O-GCD 704.

The physical SIMs are provided (STEP 1020) by the EN to the UEs in any suitable manner. The embedded SIMs can be installed into the selected UEs in a controlled manner by the enterprise's information technology (IT) personnel (or software algorithms), including assigning specific tags to individual users. This can be done for example by distributing a QR code or using Mobile Device Management (MDM) methods.

The credentials in the E-GCD are associated with a UE, and in addition, policies and/or user groups may be associated (STEP 1024) with a UE.

Any of the credentials in the EN may be communicated (STEP 1026) to one or more of the E-LCDs in the campus networks, as appropriate. For example if a UE is known or expected in a particular campus location, it is appropriate to store its credentials in that campus location so that the information is quickly accessible. Or if the UE has access only to a particular campus, then it would be appropriate to store its credentials at that campus location.

Operation to distribute the credentials then end (STEP 1030).

(16) Releasing and returning credentials

Anytime the credentials are released or are no longer used by the ECD 705, the credentials are reclaimed and loaded back into the O-GCD 704. This requires the (released/no longer used) credential entries in the ECD 705 to be deleted. If the EN uses MDM for credential management, the corresponding entries in the MDM databases need to be cleared as well. Once released into the O-GCD 704, the credential can be reassigned to any enterprise campus.

For an embedded SIM, it is possible that UE/IoT devices retain the credential information. Accordingly, when the credential is provided to another enterprise campus, the UE/IoT device that had the credential installed will be able to potentially gain access to the other enterprise. These procedures will require working with the SPP 702 to make the changes and clear the original integrated circuit card identifier (ICCID) associated with the international mobile subscriber identity (IMSI). The SPP 702 performs this transaction, given the implications on unit-based pricing and volumes for SM-DP+/OTA update server management. Three different embodiments for releasing and re-using credentials are disclosed.

1) In accordance with one embodiment, the IMSI is re-used and a new credential is regenerated with a fresh set of keys and a different ICCID.

2) In accordance with a second embodiment, OTA updates the device and replaces the IMSI associated with the credential to point to a "reserved"/"dummy" IMSI value. When the device accesses the network with this IMSI, it will implicitly fail authentication.

3) In a third embodiment, the equipment is tied to the credential and even when the IMSI-based authentication succeeds, an equipment identifier associated with the credential check will fail when the credential is no longer associated with this device.

(17) General

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of managing access to a plurality of ENs (Enterprise Networks) by a plurality of UEs User Equipment) that utilize credentials provided by an SPP (Subscriber Identification Module Provisioning Platform) to allow access to the ENs, each UE including a SIM (Subscriber Identification Module) card for storing credentials that access at least one of the ENs, comprising:
   requesting SIM cards including credentials for a plurality of UEs from the SPP, receiving said SIM card credentials;
   storing the SIM card credentials in an Orchestrator Global Credentials Database (O-GCD) that is configured to store a plurality of SIM credentials; and
   receiving a request for a number of SIM cards from one of said ENs, and responsive thereto, associating the requesting EN with SIM card credentials, and distributing SIM card credentials to the requesting EN for assignment to the UEs.

2. The method of claim 1 further comprising:
   receiving the SIM card credentials in the requesting EN; and
   storing the SIM card credentials in an E-GCD (EN's global credential database) in an EN Core Network.

3. The method of claim 2 further comprising:
   installing a SIM card in a UE, and associating the related SIM card credentials in the E-GCD with said UE.

4. The method of claim 3 further comprising:
   storing the SIM card credentials in an E-LCD (EN Local Credential Database) cache in a Campus Network connected to the EN Core Network, for access by UEs in the Campus Network.

5. The method of claim 3 further comprising:
   associating the SIM card credentials in the E-GCD with a Policy and a User Group.

6. A method of assigning credentials by an EN to a plurality of UEs, comprising the steps of:
   requesting SIM cards including SIM credentials for a plurality of UEs from an O-Net that is connected to request and receive SIM cards from an SPP;
   receiving said SIM cards from the O-Net and storing the credentials in an E-GCD in an EN Core Network;
   installing at least one SIM card in a UE, and associating the related SIM card credentials in the E-GCD with said UE; and
   storing the SIM card credentials in an E-LCD cache in a Campus Network connected to the EN Core Network, for access by UEs in the Campus Network.

7. The method of claim 6 further comprising associating the SIM card credentials in the E-GCD with a Policy and a User Group, and supplying said Policy and User Group to said E-LCD.

* * * * *